United States Patent
Mohiuddin et al.

(10) Patent No.: US 8,990,242 B2
(45) Date of Patent: Mar. 24, 2015

(54) ENHANCED QUERY SUGGESTIONS IN AUTOSUGGEST WITH CORRESPONDING RELEVANT DATA

(75) Inventors: Asad Mohiuddin, Kirkland, WA (US); Glen Joseph Fernandes, Bellevue, WA (US); Hussein Mohamed Mehanna, Redmond, WA (US); Tabreez Govani, Bellevue, WA (US); Ashwin Satyanarayana, Sammamish, WA (US); Xin Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 268 days.

(21) Appl. No.: 13/209,891

(22) Filed: Aug. 15, 2011

(65) Prior Publication Data

US 2013/0046777 A1    Feb. 21, 2013

(51) Int. Cl.
*G06F 17/30* (2006.01)

(52) U.S. Cl.
CPC ...... *G06F 17/3064* (2013.01); *G06F 17/30646* (2013.01)
USPC .......................................................... 707/767

(58) Field of Classification Search
CPC .......... G06F 17/3064; G06F 17/30864; G06F 17/30867; G06F 17/30646
See application file for complete search history.

(56) References Cited

U.S. PATENT DOCUMENTS

| | | | | |
|---|---|---|---|---|
| 6,778,979 | B2 * | 8/2004 | Grefenstette et al. | 1/1 |
| 7,499,940 | B1 * | 3/2009 | Gibbs | 1/1 |
| 7,587,385 | B2 * | 9/2009 | Vayssiere | 1/1 |
| 7,647,312 | B2 * | 1/2010 | Dai | 707/999.004 |
| 8,204,897 | B1 * | 6/2012 | Djabarov et al. | 707/767 |
| 8,639,715 | B1 * | 1/2014 | Brinck et al. | 707/767 |
| 8,667,004 | B2 * | 3/2014 | Sharif et al. | 707/766 |
| 8,676,828 | B1 * | 3/2014 | Agarwal et al. | 707/767 |
| 2003/0033288 | A1 | 2/2003 | Shanahan et al. | |
| 2004/0254928 | A1 * | 12/2004 | Vronay et al. | 707/5 |
| 2006/0248078 | A1 * | 11/2006 | Gross et al. | 707/5 |
| 2008/0016040 | A1 * | 1/2008 | Jones et al. | 707/3 |
| 2008/0071771 | A1 * | 3/2008 | Venkataraman et al. | 707/5 |

(Continued)

OTHER PUBLICATIONS

The Bing Team, "Bing Feature Update: Check the Cheapest Airfares in a Blink with Bing Travel's New Autosuggest Flight Prices", Published Feb. 25, 2011, 1 page, Retrieved Jun. 8, 2011, Available at: http://www.bing.com/community/site_blogs/b/search/archive/2011/02/25/bing-feature-update-check-the-cheapest-airfares-in-a-blink-with-bing-travel-s-new-autosuggest-flight-prices.aspx.

The Official Goggle Blog, "Two New Features Enhance Search Beyond the Results Page", Published Dec. 11, 2009, 3 pages, Retrieved Jun. 8, 2011, Available at: http://googleblog.blogspot.com/2009/12/two-new-features-enhance-search-beyond.html.

(Continued)

*Primary Examiner* — Polina Peach
(74) *Attorney, Agent, or Firm* — Dave Ream; Doug Barker; Micky Minhas

(57) ABSTRACT

Methods and computer-storage media having computer-executable instructions embodied thereon that facilitate determining enhanced query suggestions are provided. A plurality of query suggestions responsive to a user query are received. Items of data corresponding to the query suggestions are received. Based on the received query suggestions and the received items of data, enhanced query suggestions are determined. In embodiments, an enhanced query suggestion includes one or more items of data related to a respective query suggestion. A user may select at least a portion of an enhanced query suggestion. In embodiments, selection of a portion of an enhanced query suggestion provides additional information.

20 Claims, 6 Drawing Sheets

(56) References Cited

U.S. PATENT DOCUMENTS

| | | | |
|---|---|---|---|
| 2008/0104037 A1* | 5/2008 | Bierner | 707/3 |
| 2008/0147653 A1* | 6/2008 | Collier | 707/6 |
| 2009/0144234 A1* | 6/2009 | Sharif et al. | 707/3 |
| 2009/0150826 A1* | 6/2009 | Lyndersay et al. | 715/810 |
| 2009/0234811 A1* | 9/2009 | Jamil et al. | 707/3 |
| 2010/0131902 A1* | 5/2010 | Teran et al. | 715/843 |
| 2010/0146012 A1* | 6/2010 | Beaudreau et al. | 707/803 |
| 2010/0205202 A1* | 8/2010 | Yang et al. | 707/767 |
| 2010/0287170 A1 | 11/2010 | Liu et al. | |
| 2011/0022635 A1* | 1/2011 | Michael et al. | 707/780 |
| 2011/0161311 A1* | 6/2011 | Mishne et al. | 707/719 |
| 2012/0246165 A1* | 9/2012 | Batraski et al. | 707/740 |

OTHER PUBLICATIONS

Schwartz, Barry, "Yahoo Search Direct Launches", Search Engine Roundtables, Published Mar. 24, 2011, 5 pages, Retrieved Jun. 8, 2011, Available at: http://www.seroundtable.com/yahoo-search-direct-13169.html.

Bernstein, et al., "Querying the Semantic Web with Ginseng: A Guided Input Natural Language Search Engine", pp. 45-50, In Proceedings of 15th Workshop on Information Technology and Systems, (WITS 2005), Las Vegas, Dec. 2005; http://citeseerx.ist.psu.edu/viewdoc/download?doi=10.1.1.90.7212&rep=rep1&type=pdf.

* cited by examiner

ENHANCED QUERY SUGGESTIONS IN AUTOSUGGEST WITH CORRESPONDING RELEVANT DATA

BACKGROUND

Search systems often provide query suggestions while a user is inputting a portion of a user query into a search box. As such, query suggestions "expand" or "auto-complete" the query being entered, and provide the user with additional characters and/or terms to generate a more complete user query. The variety of query suggestions generated potentially enhances the user's experience with the search system by helping the user to determine a more descriptive initial user query. For various reasons, some query suggestions presented to a user may be more relevant than others. The user may make a determination regarding which query suggestions are most relevant based on viewing the query suggestion list and selecting the appropriate query. In making such a selection, the user may not have enough information to make an accurate determination of which suggested user query will direct the user to the appropriate query results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to determining enhanced query suggestions in response to a received user query. An "enhanced" query suggestion refers to a query suggestion that is associated with one or more items of data related to the query suggestion. In embodiments, an enhanced query suggestion includes one or more auto-suggested user query characters/terms, and one or more items of data related to the query suggestion. For example, a user may begin entering a query for "IPO," and a set of automatically-generated suggestions for completing the query may include the terms "IPOD NANO." As an enhancement to the query suggestion "IPOD NANO," one or more related items of data may be associated with the query suggestion, such as a price associated with a product indicated by the query suggestion. Items of data may include text, images, videos, hyperlinks, icons, and other indications of information associated with a query suggestion.

Embodiments further relate to determining enhanced query suggestions using a grammatical expansion of query suggestions based on a user's entered query. In embodiments, a grammatical expansion utilizes a predetermined pattern to suggest additional terms to complete the user query. For example, the pattern "flights from $$$ to $$$" may be used to generate query suggestions when a user begins entering the query "flights from s." According to the pattern, one exemplary query suggestion may be "flights from Seattle to Hawaii," while another query suggestion may be "flights from Seattle to New York," thereby replacing the "$$$" portions of the pattern with additional characters/terms to complete the query suggestion. These grammatically-expanded query suggestions may then be used to generate enhanced query suggestions by associating items of data with the grammatically-expanded query suggestions. For example, data regarding the cost of a flight may be provided as part of an enhanced query suggestion for the query suggestion "flights from Seattle to Hawaii."

Enhanced query suggestions may be presented to a user for selection. In embodiments, an enhanced query suggestion includes one or more items of data presented in association with a query suggestion. As such, a user may select the most relevant enhanced query suggestion by viewing the items of data, in addition to the terms of the query suggestion. Further, such additional items of data may be selectable together with the corresponding query suggestion. In another embodiment, items of data displayed as part of an enhanced query suggestion may be independently selectable, apart from the corresponding query suggestion.

BRIEF DESCRIPTION OF THE DRAWINGS

The present invention is described in detail below with reference to the attached drawing figures, wherein.

DETAILED DESCRIPTION

Figure 1:
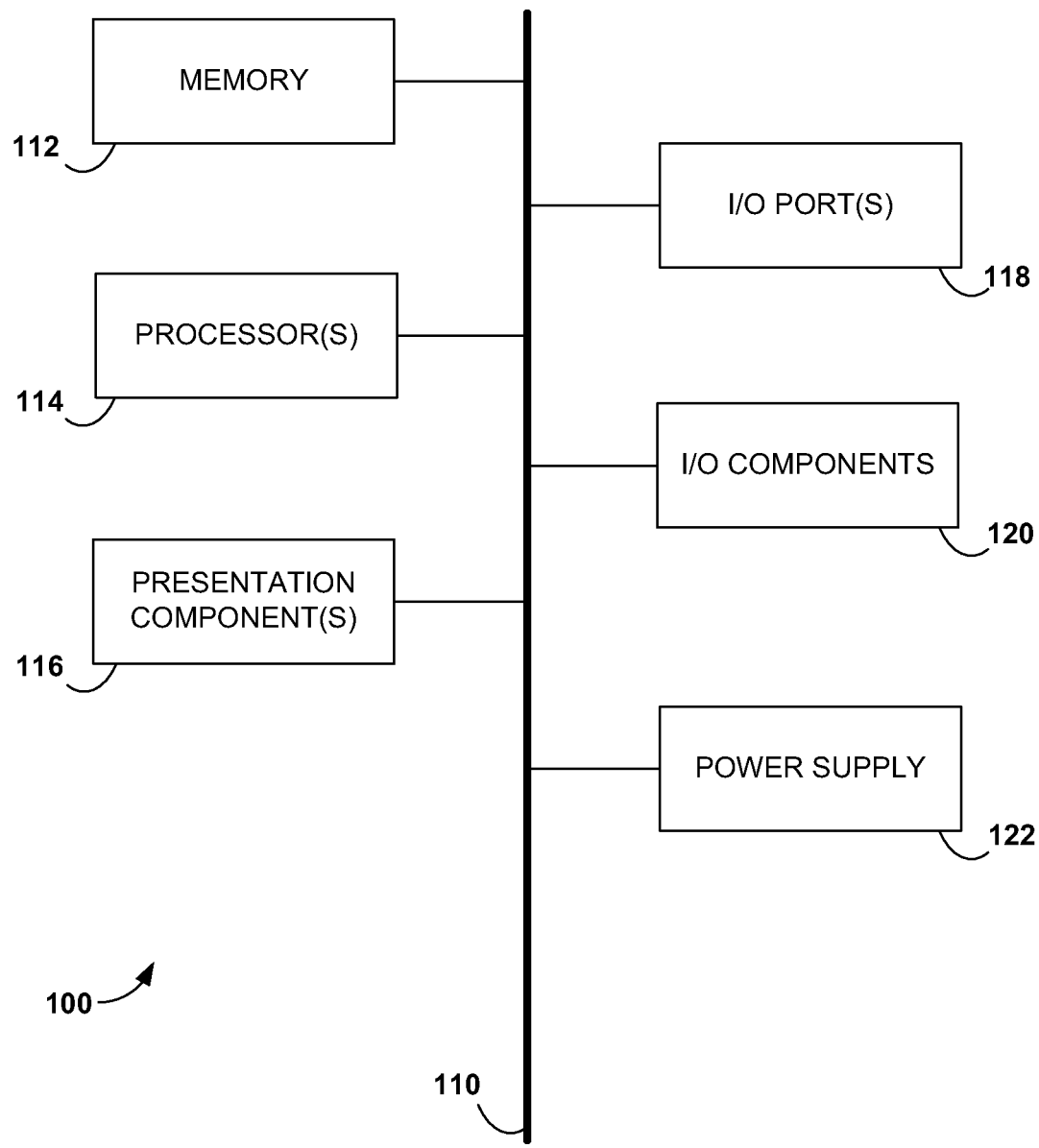
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to determining enhanced query suggestions in response to a received user query. An "enhanced" query suggestion refers to a query suggestion that is associated with one or more items of data related to the query suggestion. In embodiments, an enhanced query suggestion includes one or more auto-suggested user query characters/terms, and one or more items of data related to the query suggestion. For example, a user may begin entering a query for "IPO," and a set of automatically-generated suggestions for completing the query may include the terms "IPOD NANO." As an enhancement to the query suggestion "IPOD NANO," one or more related items of data may be associated with the query suggestion, such as a price associated with a product indicated by the query suggestion. Items of data may include text, images, videos, hyperlinks, icons, and other indications of information associated with a query suggestion.

Embodiments further relate to determining enhanced query suggestions using a grammatical expansion of query suggestions based on a user's entered query. In embodiments, a grammatical expansion utilizes a predetermined pattern to suggest additional terms to complete the user query. For example, the pattern "flights from $$$ to $$$" may be used to generate query suggestions when a user begins entering the query "flights from s." According to the pattern, one exemplary query suggestion may be "flights from Seattle to Hawaii," while another query suggestion may be "flights from Seattle to New York," thereby replacing the "$$$" portions of the pattern with additional characters/terms to complete the query suggestion. These grammatically-expanded query suggestions may then be used to generate enhanced query suggestions by associating items of data with the grammatically-expanded query suggestions. For example, data regarding the cost of a flight may be provided as part of an enhanced query suggestion for the query suggestion "flights from Seattle to Hawaii."

Enhanced query suggestions may be presented to a user for selection. In embodiments, an enhanced query suggestion includes one or more items of data presented in association with a query suggestion. As such, a user may select the most relevant enhanced query suggestion by viewing the items of data, in addition to the terms of the query suggestion. Further, such additional items of data may be selectable together with the corresponding query suggestion. In another embodiment, items of data displayed as part of an enhanced query suggestion may be independently selectable, apart from the corresponding query suggestion.

Accordingly, one embodiment of the present invention is directed to one or more computer-readable media storing computer-useable instructions that, when used by one or more computing devices, causes the one or more computing devices to perform a method of determining enhanced query suggestions. The method comprises: receiving at least a portion of a user query; receiving one or more query suggestions responsive to the at least a portion of a user query; receiving one or more items of data that correspond to at least one of the one or more query suggestions; determining one or more enhanced query suggestions responsive to the at least a portion of a user query, the one or more enhanced query suggestions comprising at least one of the one or more query suggestions and at least one of the corresponding one or more items of data.

In another embodiment, the invention is directed to a method performed by one or more server devices for determining enhanced query suggestion in response to receiving at least a portion of a user query. The method comprises: receiving at least a portion of a user query; determining one or more query suggestions responsive to the at least a portion of a user query; receiving one or more items of data that correspond to at least one of the one or more query suggestions; determining one or more enhanced query suggestions responsive to the at least a portion of a user query, the one or more enhanced query suggestions comprising at least one of the one or more query suggestions and at least one of the corresponding one or more items of data.

A further embodiment of the present invention is directed to one or more computer-readable media storing computer-useable instructions that, when used by one or more computing devices, causes the one or more computing devices to perform a method of determining enhanced query suggestions. The method comprises: receiving at least a portion of a user query, wherein the at least a portion of a user query comprises at least a portion of at least one term; receiving a plurality of query suggestions responsive to the at least a portion of a user query, wherein the plurality of query suggestions comprises additional terms in association with the at least a portion of at least one term, and further wherein at least one of the plurality of query suggestions are determined using a grammatical expansion of the at least a portion of a user query, wherein generating the grammatical expansion comprises: (1) identifying a predetermined pattern for suggesting additional terms that complete the at least a portion of a user query; and (2) determining one or more additional terms that satisfy the predetermined pattern; receiving one or more items of data that correspond to at least one of the plurality of query suggestions, wherein the one or more items of data are received from an Answer Service; determining a plurality of enhanced query suggestions responsive to the at least a portion of a user query, the plurality of enhanced query suggestions comprising at least one of the plurality of query suggestions and at least one of the corresponding one or more items of data, wherein determining a plurality of enhanced query suggestions comprises: (1) determining a category of data associated with the at least a portion of a user query; and (2) determining at least one relevant item of data from the one or more items of data, wherein the at least one relevant item of data satisfies the determined category.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media accessible by the computing device 100 and includes both volatile and nonvolatile media, and removable and non-removable media, implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

Figure 2:
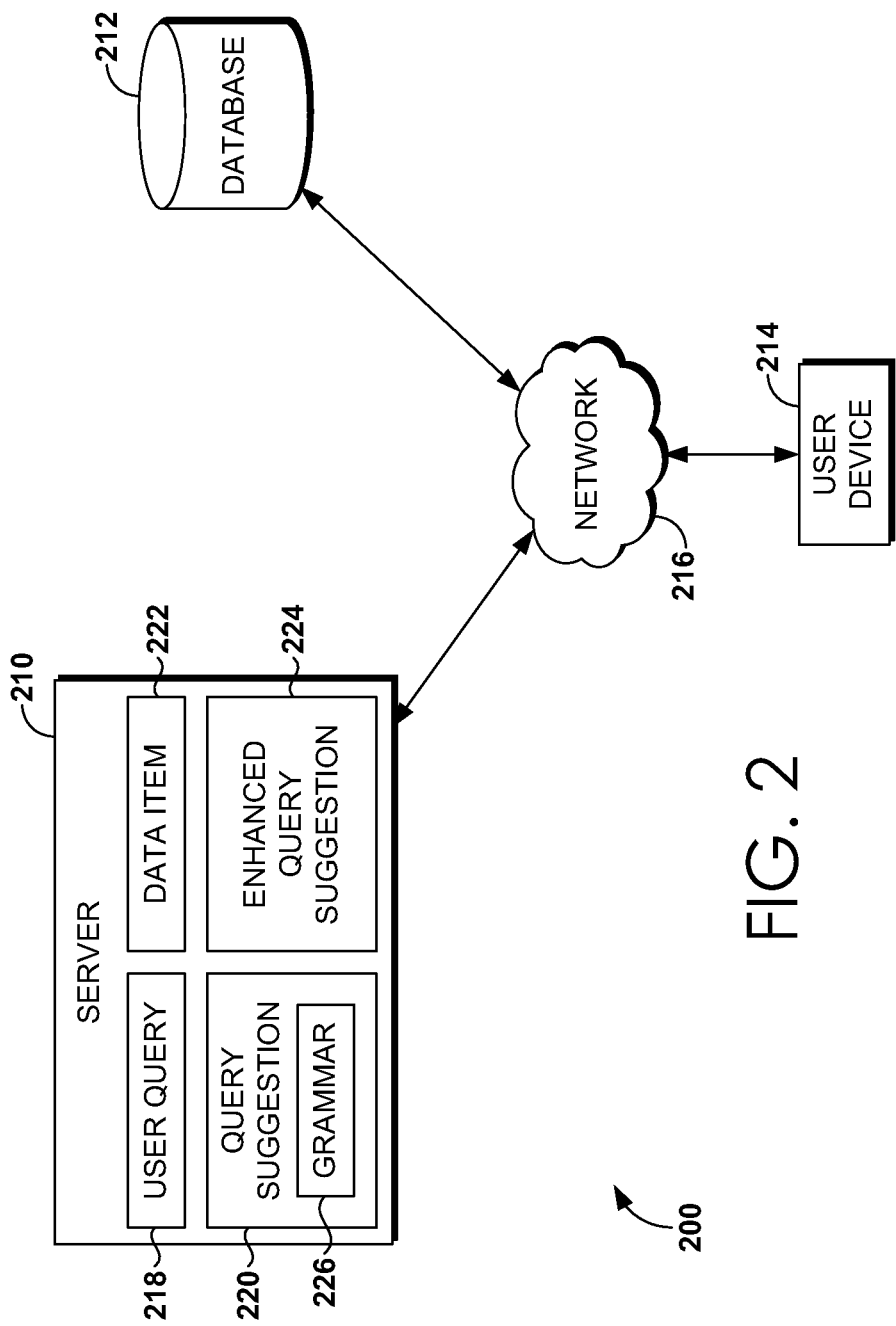
FIG. 2 is a block diagram of an exemplary system in which embodiments of the invention may be employed.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein.

Among other components not shown, the system 200 includes a server 210, a database 212, and a user device 214, all in communication with one another through a network 216. Further, the server 210 includes a user query component 218, a query suggestion component 220, a data item component 222, and an enhanced query suggestion component 224. Each of the user device 214 and the server 210 may be any type of computing device, such as a computing device 100 described with reference to FIG. 1, for example. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into other components. It will be understood by those of ordinary skill in the art that the components/modules illustrated in FIG. 2 are exemplary in nature and in number, and should not be construed as limiting. Any number of components/modules may be employed to achieve the desired functionality within the scope of embodiments hereof. Further, components/modules may be located on any number of servers, search engine computing devices, or the like. By way of example only, the enhanced query suggestion component 224 might reside outside the server 210, on a separate server, cluster of servers, or a computing device remote from one or more of the remaining components.

It should be understood that this and other arrangements described herein are set forth only as examples. Other arrangements and elements (e.g. machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The database 212 is configured to store various types of information used by the server 210 to determine enhanced query suggestions. In embodiments, such determination is based on at least a portion of a user query entered by a user. The type of information stored in database 212 may include, for example, common queries that have been previously issued or submitted to a search engine or server 210. In embodiments, at least a portion of these common queries may be stored in a query log such that the query log may be accessed to identify common queries. In further embodiments, information stored in database 212 may be used to determine one or more query suggestions. For example, query suggestion component 220 may determine query suggestions based on information stored in database 212.

Figure 5:
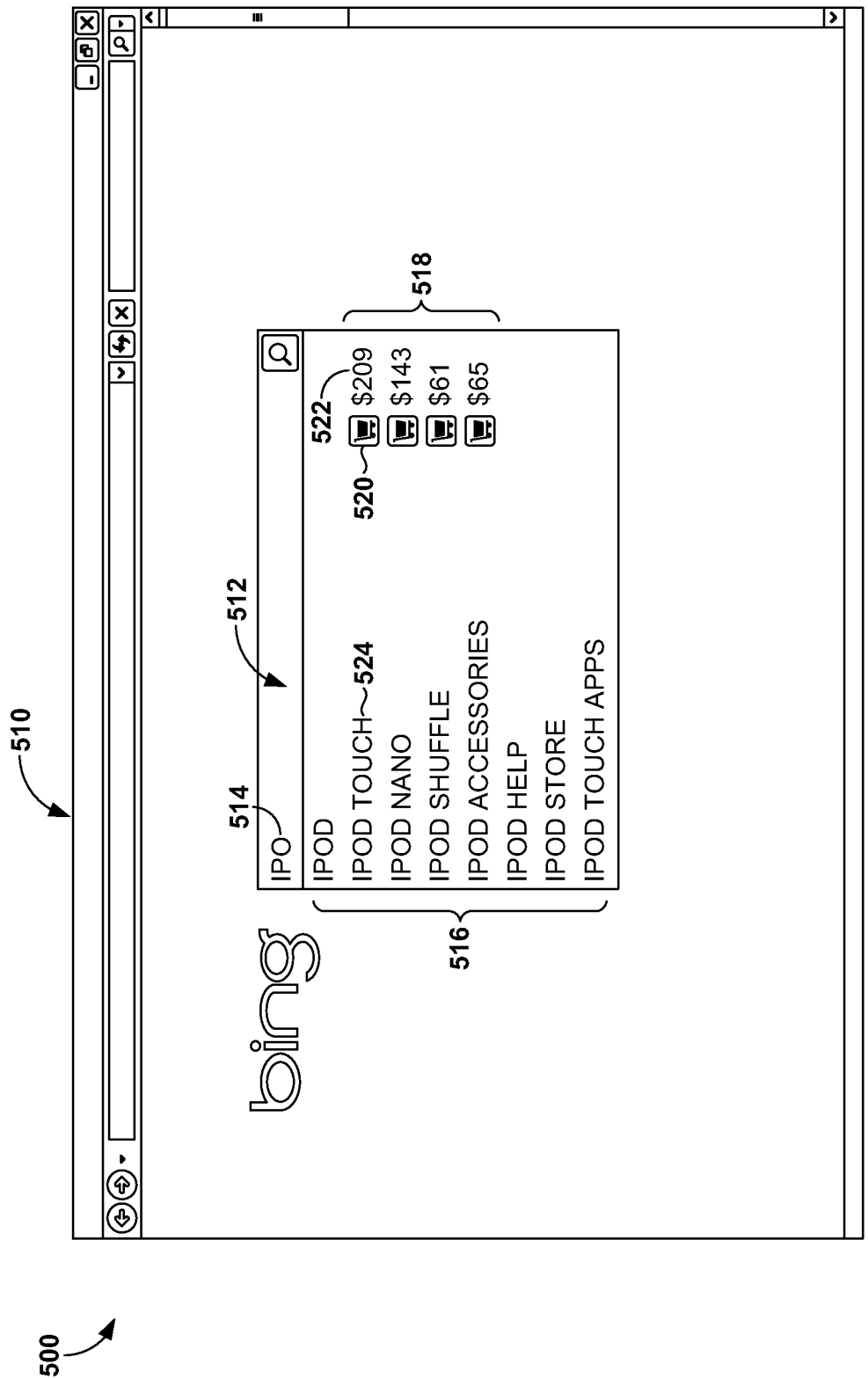
FIGS. 5-7 are illustrative displays of enhanced query suggestions determined in accordance with embodiments of the present invention.

Information stored in database 212 may also include items of data that correspond to query suggestions. The items of data may be included in association with one or more enhanced query suggestions. For example, the database 212 may include a price for purchasing a product related to a particular query suggestion. This price may then be associated with the particular query suggestion, as part of an enhanced query suggestion. Referring briefly to FIG. 5, one example of an enhanced query suggestion includes the query suggestion "IPOD NANO," as well as a shopping cart icon and a price of $143 (i.e. the items of data associated with the query suggestion). As previously discussed, items of data may include text, images, videos, hyperlinks, icons, and other indications of information and/or data associated with the query suggestion. In embodiments, items of data in database 212 are retrieved from an Answer Service.

Figure 6:
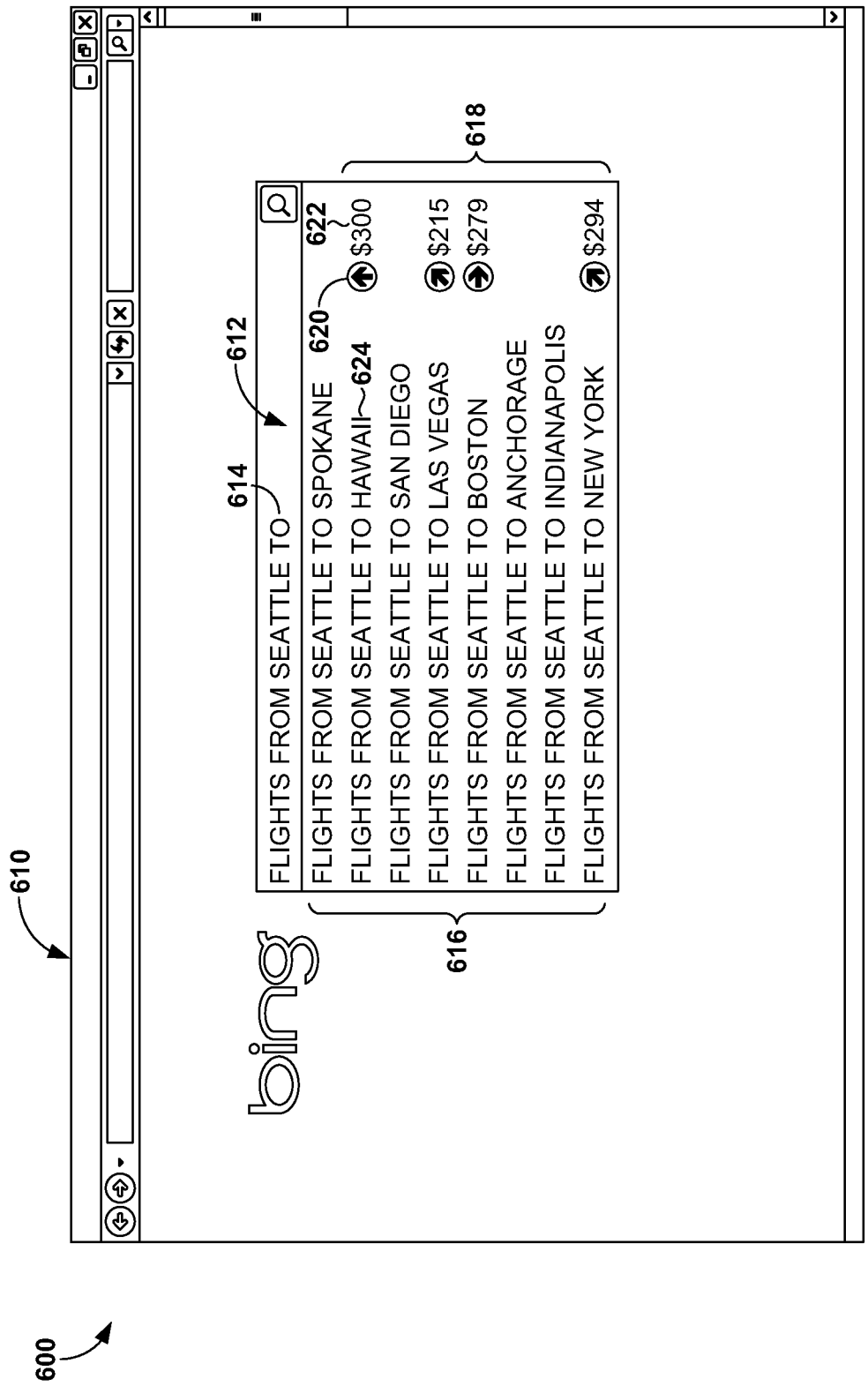

In another example, the database 212 may include a price for purchasing a service related to a particular query suggestion. This price may then be associated with the particular query suggestion, as part of an enhanced query suggestion. Referring briefly to FIG. 6, one example of an enhanced query suggestion includes the query suggestion "FLIGHTS FROM SEATTLE TO LAS VEGAS," as well as a flight indicator and a price of $215 (i.e. the items of data associated with the query suggestion).

User device 214 may be any type of computing device owned and/or operated by an end user that can access the network 216. For example, the user device 214 may be a desktop computer, a laptop computer, a tablet computer, a mobile device, or any other device having network access. Generally, an end user may employ the user device 214 to, among other things, submit a user query to the server 210. In embodiments, a user query received from the user device 214 may be received by the user query component 218 of the server 210. For instance, the end user may employ a web browser on the user device 214 to access and view enhanced query suggestions using a search engine associated with the server 210. According to embodiments of the present invention, the user additionally may be able to interact with the user device 214 by selecting at least a portion of an enhanced query suggestion presented to the user, as more fully described below. Further, the server 210 may comprise multiple components that facilitate receiving a user query, determining and/or receiving query suggestions responsive to the received user query, receiving data items that correspond to determined/received query suggestions, and determining enhanced query suggestions.

User query component 218 receives an indication of at least a portion of a user query. For example, a portion of a user query may be entered into a search box on a webpage viewed on a user device 214. The user query may be subsequently received by the server 210 via user query component 218. Receiving at least a portion of a user query includes receiving any number of indications of a user query. For example, a portion of a user query may include any number of characters and/or terms, such as the query "IPO" being a portion of the query for "IPOD." Further, a user query may include any number of characters and/or terms, whether completed or incomplete, such as a user query including two terms and a portion of a third term.

In embodiments, query suggestion component 220 receives one or more query suggestions responsive to a user query (or portion of a user query) received by user query component 218. A query suggestion may be based on previously-submitted user queries identified from a query log, which correspond to the character sequence submitted as part of a user query. As such, a query suggestion may provide additional characters and/or terms that complete at least a portion of a user query. For example, a query suggestion for the user query "IPO" may be "IPOD," adding the character "D" in the query suggestion. In another example, a query suggestion for the user query "IPO" may be "IPOD NANO," adding the characters/terms "D NANO" to the submitted query. As previously discussed, received query suggestions may be derived from query data stored in database 212.

In further embodiments, query suggestion component 220 determines one or more query suggestions in response to a submitted user query (or portion of a user query) received by user query component 218. For example, query suggestion component 220 may determine potential query suggestions to complete the submitted query based on prior queries. As such, query suggestion component 220 may determine query suggestions by accessing query data stored in database 212.

In another embodiment, grammar component 226 of query suggestion component 220 may be used to determine potential query suggestions by grammatically expanding at least a portion of the user query. A grammatical expansion of a user query (or portion of a user query) includes additional characters/terms suggested to complete the user query (or portion thereof) according to a predetermined pattern of characters and/or terms. For example, as briefly discussed above, the predetermined pattern "flights from $$$ to $$$" may be used to determine query suggestions for a user query that starts with the terms "flights from," and includes two added terms in place of the "$$$" indicators. Accordingly, the grammar component 226 may determine one or more potential query suggestions that satisfy predetermined patterns.

In further embodiments, the query suggestion component 220 may determine one or more query suggestions that satisfy the entered portion of a query, while a portion of the user query is being entered. For example, as soon as a user submits the query "flights from s," the query suggestion component may generate one or more query suggestions that complete the user query according to the pattern "flights from s$$ to $$$." Such a determination may include query suggestions such as "flights from seattle to hawaii" and "flights from san francisco to hawaii."

Data item component 222 provides items of data that correspond to the query suggestions received and/or determined by query suggestion component 220. In embodiments, data item component 222 provides items of corresponding data that are used to determine a particular type of enhanced query suggestion. For example, for the query suggestion "IPOD NANO," the data item component 222 may provide a representative price to associate with the "IPOD NANO" query suggestion. Representative pricing data may be derived from any number of sources, such as a search engine's shopping website. As such, a representative price for purchasing an "IPOD NANO" may be associated with the query suggestion "IPOD NANO," and presented as part of an enhanced query suggestion. In embodiments, items of data that correspond to query suggestions may be accessed from database 212.

Enhanced query suggestion component 224 determines one or more enhanced query suggestions that are responsive to a received user query. In embodiments, the enhanced query suggestion component 224 determines enhanced query suggestions that include both the query suggestions received from query suggestion component 220, and the corresponding items of data received from data item component 222. In embodiments, enhanced query suggestion component 224 makes a determination as to the particular type of data that corresponds to a particular type of user query. For example, for the user query "FLIGHTS FROM SEATTLE TO," a determination may be made that the user query is a purchasing inquiry, for which pricing data is desired. Based on this determination, data item component 222 may provide pricing data that corresponds to the query suggestions for the user query. For example, pricing data corresponding to the query suggestion "FLIGHTS FROM SEATTLE TO HAWAII" may be retrieved from data item component 222 by enhanced query suggestion component 224. In another embodiment, based on preferences received from enhanced query suggestion component 224 regarding a particular type of user query, data item component 222 may make a determination of which data items correspond to the query suggestion(s) for the user query.

Corresponding data items may be presented to a user as part of an enhanced query suggestion. In embodiments, at least a portion of an enhanced query suggestion may be selected by a user. For example, a data item associated with a query suggestion may be independently selectable, apart from the query suggestion. In further embodiments, a user selection of one or more data items may produce the same result as the selection of a data item's corresponding query suggestion. As such, a data item and the corresponding query suggestion of an enhanced query suggestion may be selected as a whole.

The relevancy and/or responsiveness of a corresponding item of data received from data item component 222 may be determined by enhanced query suggestion component 224. In embodiments, enhanced query suggestion component 224 associates at least one item of data with at least one query suggestion responsive to a user query. For example, the enhanced query suggestion component 224 may determine at category of data associated with at least a portion of a user query. Based on the determined category, the enhanced query suggestion component 224 may determine at least one relevant item of data.

Figure 3:
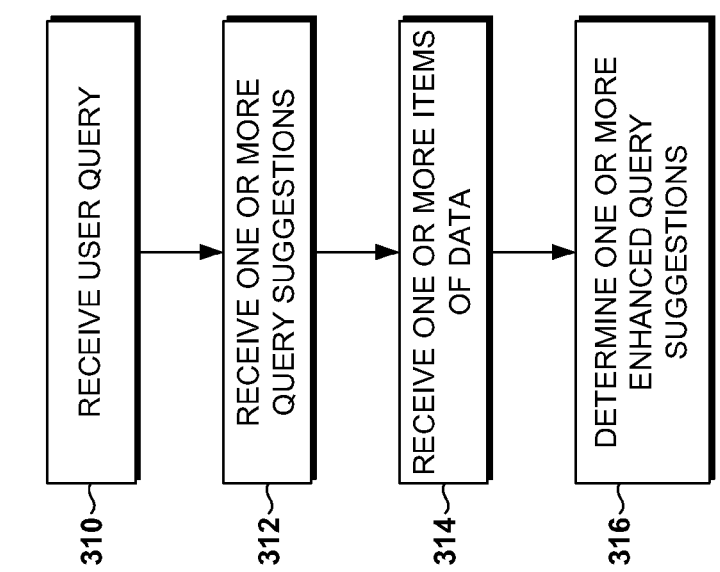

Referring now to FIG. 3, a flow diagram of an exemplary method for determining enhanced query suggestions is provided. As indicated at block 310, a user query is received. A user query, and/or a portion of a user query, may be received by user query component 218 of the server 210 of FIG. 2. In embodiments, the received user query includes at least a portion of at least one term. At block 312, one or more query suggestions responsive to the user query are received. As indicated at block 314, one or more items of data are received. The one or more items of data correspond to the query suggestions received at block 312. At block 316, one or more enhanced query suggestions are determined, as described above.

Figure 4:
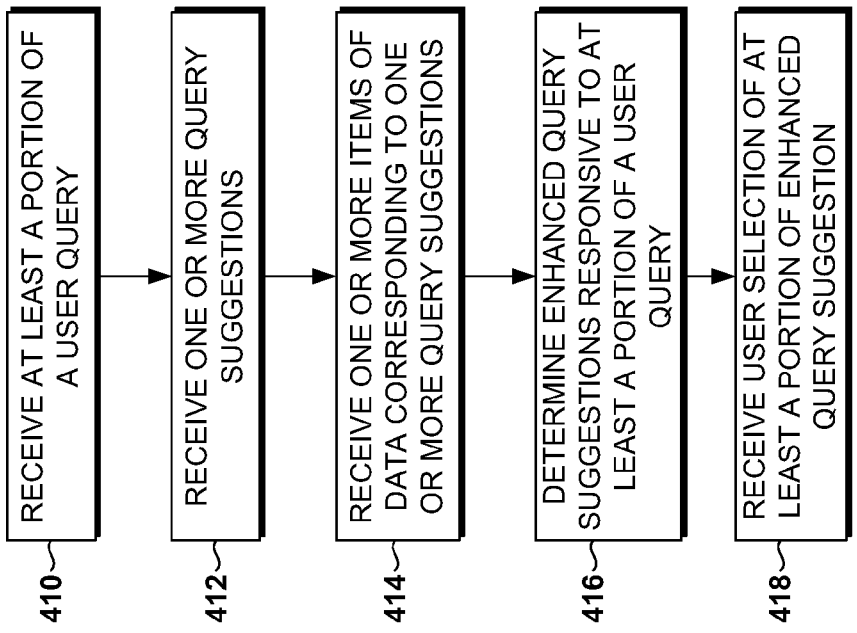
FIGS. 3-4 are flow diagrams of exemplary methods for determining enhanced query suggestions, in accordance with embodiments of the present invention.

Turning now to FIG. 4, a flow diagram of an exemplary method for determining enhanced query suggestions is provided. As indicated at block 410, at least a portion of a user query is received. At block 412, one or more query suggestions responsive to the user query of block 410 are received. The one or more query suggestions may be determined using a grammatical expansion of the received user query. At block 414, one or more items of data corresponding to the one or more query suggestions are received. As shown at block 416, enhanced query suggestions responsive to the user query are determined. Further, at block 418, a user selection of at least a portion of an enhanced query suggestion is received.

With reference now to FIG. 5, an illustrative display 500 of enhanced query suggestions determined in accordance with embodiments of the present invention is provided. Display 500 includes a screenshot 510 of an exemplary search system's webpage. Screenshot 510 includes search box 512, with a portion of a submitted user query 514. In response to the submitted user query 514, a plurality of query suggestions 516 are provided. As shown in screenshot 510, a portion of the query suggestions 516 are enhanced with items of data 518. In some embodiments, all of the query suggestions 516 are associated with items of data, while in other embodiments, only a portion of the query suggestions 516 are enhanced with items of data.

Items of data 518 may include text, images, videos, hyperlinks, icons, and other indications of information associated with the query suggestions 516 received in response to user query 514. For example, shopping cart icon 520 and pricing information 522 are shown in association with query suggestion 524. As previously discussed, the association of one or more items of data with one or more query suggestions may be referred to as "enhanced query suggestions." For example, the association of shopping cart icon 520, pricing information 522, and query suggestion 524 may be referred to as an "enhanced query suggestion." Further, the shopping cart icon 520 and pricing information 522 data items related to query suggestion 524 are presented in association with query suggestion 524.

In embodiments, selection of the shopping cart icon 520 and/or the pricing information 522 results in the retrieval of a plurality of query results responsive to the query suggestion 524. As such, the selection of the data items and/or the query suggestion may result in retrieval of query results responsive to an enhanced query suggestion. For example, based on selection of the shopping cart icon 520, a search engine results webpage may present a plurality of query results responsive to query suggestion 524. In embodiments, a plurality of query results includes one or more query results that were used to determine pricing information 522, such as a webpage from which pricing information 522 was extracted. In another embodiment, one or more query results that were used to determine pricing information 522 are presented in a particular location on a search engine results webpage, among other query results provided in response to selection of the shopping cart icon 520. For example, a webpage from which the pricing information 522 was derived may be presented at the top of a list of query results on a search engine results webpage.

In other embodiments, a user's selection of the shopping cart icon 520 and/or the pricing information 522 results in directing the user to a particular location, other than a search engine results webpage. In one embodiment, selection of the shopping cart icon 520 and/or the pricing information 522 results in directing the user to a purchasing webpage where the user can purchase a product associated with query suggestion 524. For example, selection of the pricing information 522 may direct a user to a particular webpage that was used to determine pricing information 522. As such, shopping cart icon 520 and pricing information 522 may be independently selectable, apart from query suggestion 524.

As will be understood, the "selection" of an item viewed in the screenshot 510 refers to any an indication of a user's selection of a particular item. For example, an indication of a user's selection may be provided by a user "clicking" on the selected item, "hovering" over the selected item, or otherwise indicating the user's selection of a particular item of data. As indicated above, in one example, selection of an enhanced query suggestion may be received with respect to the query suggestion portion of the enhanced query suggestion. In another example, selection of an enhanced query suggestion may be received with respect to an item of data associated with the enhanced query suggestion.

In embodiments, additional information may be presented in response to selecting one or more of the items of data 518. For example, selecting the shopping cart icon 520 may result in the presentation of a "pop-up" window that provides an indication of one or more sources from which the pricing information 522 was derived, such as a shopping website. In another example, selection of the shopping cart icon 520 may result in the presentation of indications of a plurality of shopping webpages from which to purchase the item indicated in query suggestion 524. In one embodiment, indications of the plurality of shopping webpages are presented as part of a search engine results webpage.

Referring next to FIG. 6, an illustrative display 600 of enhanced query suggestions determined in accordance with embodiments of the present invention is provided. Display 600 includes a screenshot 610 of an exemplary search system's webpage. Screenshot 610 includes search box 612, with a portion of a submitted user query 614. In response to the submitted user query 614, a plurality of query suggestions 616 are provided. As shown in screenshot 610, a portion of the query suggestions 616 are enhanced with items of data 618. In some embodiments, all of the query suggestions 616 are associated with items of data, while in other embodiments, only a portion of the query suggestions 616 are enhanced with items of data.

Items of data 618 may include text, images, videos, hyperlinks, icons, and other indications of information associated with the query suggestions 616 received in response to user query 614. For example, flight indicator 620 and pricing information 622 are shown in association with query suggestion 624. In embodiments, selection of the flight indicator 620 and/or the pricing information 622 results in the retrieval of a plurality of query results responsive to the query suggestion 624. As such, the selection of data items and/or query suggestions may result in the retrieval of query results responsive to an enhanced query suggestion. In other embodiments, selection of the flight indicator 620 and/or the pricing information 622 results in directing a user to a particular location, other than a search engine results webpage. For example, selection of the flight indicator 620 and/or the pricing information 622 may direct a user to a purchasing webpage where the user can purchase a flight associated with query suggestion 624. As such, flight indicator 620 and pricing information 622 may be independently selectable, apart from query suggestion 624. In other words, for an enhanced query suggestion including a query suggestion and one or more items of data, the query suggestion and each of the one or more items of data may be independently selectable.

Figure 7:
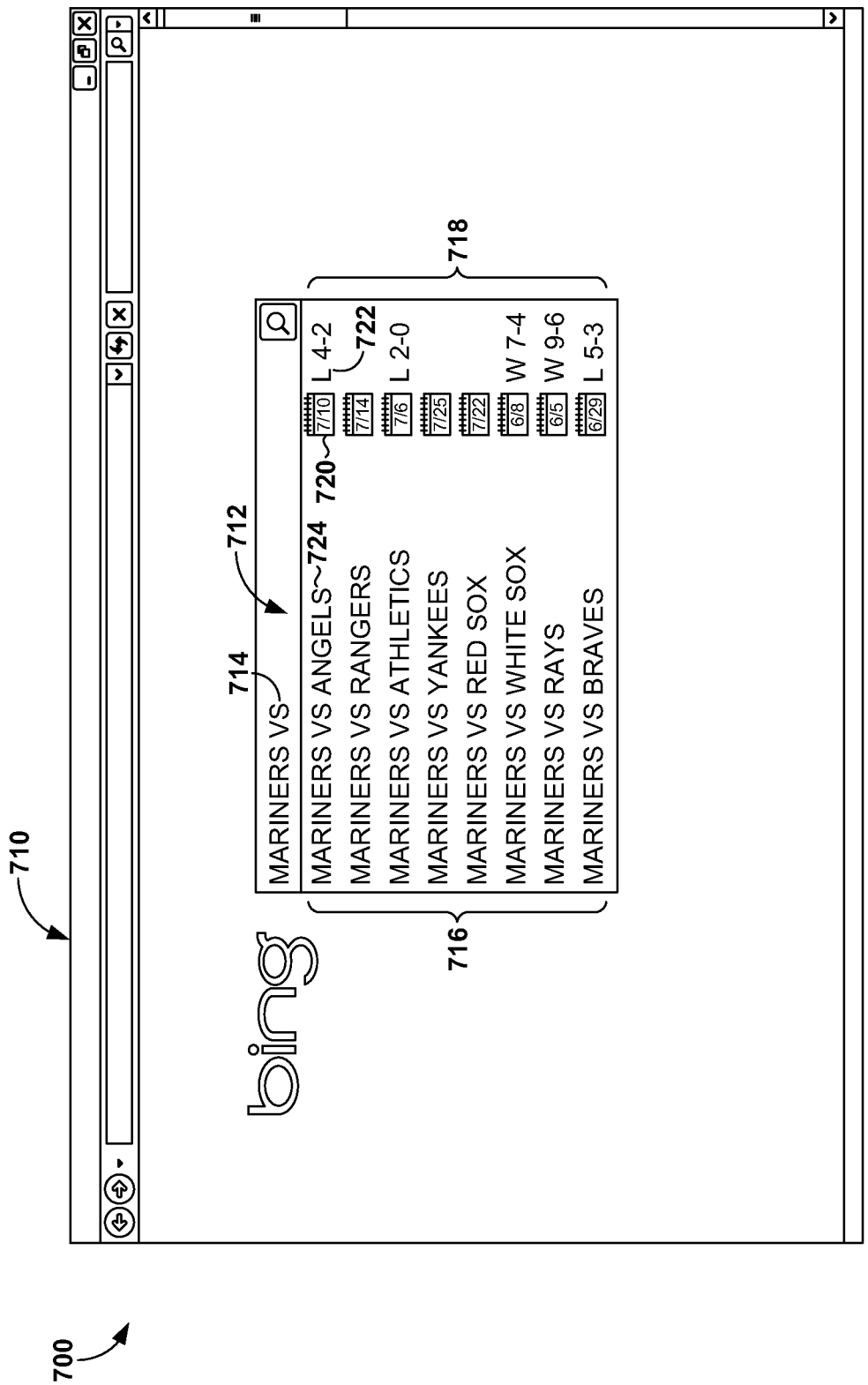

Referring finally to FIG. 7, a further illustrative display 700 of enhanced query suggestions determined in accordance with embodiments of the present invention is provided. Display 700 includes a screenshot 710 of an exemplary search system's webpage. Screenshot 710 includes search box 712, with a portion of a submitted user query 714. In response to the submitted user query 714, a plurality of query suggestions 716 are provided. As shown in screenshot 710, a portion of the query suggestions 716 are enhanced with items of data 718. In some embodiments, all of the query suggestions 716 are associated with items of data, while in other embodiments, only a portion of the query suggestions 716 are enhanced with items of data.

Items of data 718 may include text, images, videos, hyperlinks, icons, and other indications of information associated with the query suggestions 716 received in response to user query 714. For example, calendar indicator 720 and score information 722 are data items shown in association with query suggestion 724. In embodiments, selection of the calendar indicator 720 and/or the score information 722 results in the retrieval of a plurality of query results responsive to the query suggestion 724. In another embodiment, selection of the calendar indicator 720 and/or the score information 722 results in directing a user to a particular location, other than a search engine results webpage. For example, selection of the calendar indicator 720 and/or the score information 722 may direct a user to a purchasing webpage where the user can purchase a product associated with query suggestion 724. As such, calendar indicator 720 and score information 722 may be independently selectable, apart from query suggestion 724. As discussed above with reference to FIG. 5, additional information may be presented in response to selecting one or more of the items of data 718.

As can be understood, embodiments of the present invention provide a method of determining enhanced query suggestions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable hardware storage devices having computer-executable instructions embodied thereon that, when executed by a computing system having a processor and a memory, cause the computing system to perform a method for determining enhanced query suggestions, the method comprising:
   receiving at least a portion of a user query;
   determining a particular category of data based on the at least a portion of a user query;
   receiving a first query suggestion and a second query suggestion, each query suggestion responsive to the at least a portion of a user query;
   receiving a first item of data that corresponds to the first query suggestion and a second item of data that corresponds to the second query suggestion, wherein the first item of data and the second item of data both correspond to the same particular category of data determined based on the at least a portion of a user query;
   receiving an indicator visually representing the particular category of data;
   determining a first enhanced query suggestion and a second enhanced query suggestion, each responsive to the at least a portion of a user query, wherein the first enhanced query suggestion comprises the first query suggestion, the first item of data, and the indicator, wherein the second enhanced query suggestion comprises the second query suggestion, the second item of data, and the indicator, and wherein the determining of the first enhanced query suggestion and the second enhanced query suggestion comprises accessing a database that comprises common queries that have been previously issued or submitted to a search engine or server, and wherein each of the first item of data and the second item of data are separately selectable from the first query suggestion and the second query suggestion, respectively, such that,
   upon receiving a user selection of the first query suggestion or the second query suggestion, determining a plurality of query results that satisfy the user selection, and
   upon receiving a user selection of the first item of data or the second item of data, presenting an indication of one or more sources from which the corresponding one or more items of data was derived in a pop-up interface area.

2. The one or more computer-readable hardware storage devices of claim 1, wherein the at least a portion of a user query comprises at least a portion of at least one term.

3. The one or more computer-readable hardware storage devices of claim 1, wherein the received one or more query suggestions were determined using a grammatical expansion of the at least a portion of a user query, wherein the grammatical expansion comprises a predetermined pattern for suggesting additional terms that complete the at least a portion of a user query.

4. The one or more computer-readable hardware storage devices of claim 1, wherein receiving the one or more items of data comprises retrieving the one or more items of data from a database storing the one or more items of data corresponding to the one or more query suggestions.

5. The one or more computer-readable hardware storage devices of claim 1, wherein determining one or more enhanced query suggestions responsive to the at least a portion of a user query comprises associating at least one of the one or more items of data with at least one of the one or more query suggestions.

6. The one or more computer-readable hardware storage devices of claim 1, wherein the method further comprises:
   receiving a user selection of one of the one or more query suggestions; and determining a plurality of query results that satisfy the user selection.

7. The one or more computer-readable hardware storage devices of claim 1, wherein the method further comprises:
   receiving a user selection of one of the one or more enhanced query suggestions; and
   determining additional information regarding the one or more enhanced query suggestion.

8. A method performed by one or more server devices for determining enhanced query suggestion in response to receiving at least a portion of a user query, the method comprising:
   receiving the at least a portion of a user query;
   determining a plurality of query suggestions responsive to the at least a portion of a user query;
   determining a particular data type responsive to the at least a portion of a user query;
   receiving a plurality of items of data that correspond to the particular data type;
   determining an indicator visually representing the particular data type;
   for each of the plurality of query suggestions responsive to the at least a portion of a user query, receiving at least one item of data from the plurality of items of data that corresponds to the particular data type;
   determining more than one enhanced query suggestions, each of the more than one enhanced query suggestions comprising:
      one query suggestion from the plurality of query suggestions responsive to the at least a portion of a user query, an item of data that corresponds to both the particular data type responsive to the at least a portion of a user query and the one query suggestion, and the indicator visually representing the particular data type, wherein the one query suggestion, the item of data, and the indicator are each separately selectable from one another,
   wherein the determining more than one enhanced query suggestions comprises accessing a database that comprises common queries that have been previously issued or submitted to a search engine or server;
   upon receiving a user selection of at least one of the plurality of query suggestions of the more than one enhanced query suggestions, determining a plurality of query results that satisfy the user selection; and
   upon receiving a user selection of at least one of the at least one item of data of the more than one enhanced query suggestions, presenting an indication of one or more sources from which the at least one of the at least one item of data was derived in a pop-up interface area.

9. The method of claim 8, wherein determining a plurality of query suggestions responsive to the at least a portion of a user query comprises generating a grammatical expansion of the at least a portion of a user query.

10. The method of claim 9, wherein generating a grammatical expansion comprises:
   identifying a predetermined pattern for suggesting additional terms that complete the at least a portion of a user query; and
   determining one or more additional terms that satisfy the predetermined pattern.

11. The method of claim 8, wherein receiving a plurality of items of data that correspond to the particular data type comprises receiving the plurality of items of data from a database storing one or more of query data or the plurality of items of data that correspond to the particular data type.

12. The method of claim 8, wherein the method further comprises:
   receiving a user selection of the selectable enhanced query suggestions; and
   determining a plurality of query results that satisfy the user selection.

13. A system for determining enhanced query suggestions that are responsive to at least a portion of a user query, the system comprising:
   one or more processors coupled to computer storage medium, the computer storage medium having stored thereon a plurality of computer software components executable by the one or more processors, the computer software components comprising:
   a user query component configured to receive at least one indication of at least a portion of a user query;
   a data item component configured to determine a particular data type responsive to the at least a portion of the user query and to provide at least one item of data that corresponds to both the at least a portion of a user query and the particular data type;
   a query suggestion component configured to determine one or more query suggestions responsive to the at least one indication by accessing query data stored in a database; and
   an enhanced query suggestion component configured to:
      (1) determine at least one enhanced query suggestion that is responsive to the at least a portion of a user query, the at least one enhanced query suggestion including the at least one item of data, the one or more query suggestions, and an indicator visually representing the particular data type, wherein the at least one item of data, the one or more query suggestions, and the indicator visually representing the particular data type are separately selectable from one another, and wherein the determining the at least one enhanced query suggestion comprises accessing a database that comprises common queries that have been previously issued or submitted to a search engine or server,
      (2) determine, upon receiving a user selection of at least one of the one or more query suggestions, a plurality of query results that satisfy the user selection, and
      (3) present, upon receiving a user selection of at least one of the at least one item of data, an indication of one or more sources from which the at least one of the at least one item of data was derived in a pop-up interface area.

14. The system of claim 13, wherein the database is configured to store one or more of query data, a query log having at least one query previously submitted to the system, or at least one item of data corresponding to the one or more query suggestions.

15. The system of claim 14, wherein the database is further configured to store associations between the at least one item of data and the one or more enhanced query suggestions.

16. The system of claim 13, wherein the data item component is further configured to provide at least one item of data used to determine a particular type of enhanced query suggestion.

17. The system of claim 13, wherein the enhanced query suggestion component is further configured to include at least one of the one or more query suggestions and the at least one item of data within at least a portion of the at least one enhanced query suggestion.

18. The system of claim 13, wherein the enhanced query suggestion component is further configured to determine a plurality of enhanced query suggestion that are responsive to the at least a portion of a user query, each of the plurality of enhanced query suggestions including an item of data of the same particular data type.

19. The system of claim 13, wherein the enhanced query suggestion component determines the at least one enhanced query suggestion while the at least one indication of the least a portion of a user query is received.

20. The system of claim 13, wherein the system provides the at least one enhanced query suggestion to be communicated to a user while the at least a portion of a user query is being input via a remote device.

* * * * *